(12) United States Patent
Ellis et al.

(10) Patent No.: US 8,905,714 B2
(45) Date of Patent: Dec. 9, 2014

(54) TURBINE ROTOR BLADE PLATFORM COOLING

(75) Inventors: Scott Edmond Ellis, Easley, SC (US); Aaron Ezekiel Smith, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 411 days.

(21) Appl. No.: 13/341,027

(22) Filed: Dec. 30, 2011

(65) Prior Publication Data

US 2013/0171005 A1    Jul. 4, 2013

(51) Int. Cl.
*F01D 5/18*    (2006.01)

(52) U.S. Cl.
USPC ...................................... 416/97 R

(58) Field of Classification Search
CPC .......... F01D 5/08; F01D 5/081; F01D 5/082; F01D 5/084; F01D 5/18; F01D 5/187; F01D 5/188; F01D 5/189; F01D 5/186
USPC ............. 415/115, 116; 416/96 R, 96 A, 97 R, 416/97 A, 95
See application file for complete search history.

(56) References Cited

U.S. PATENT DOCUMENTS

| | | | | |
|---|---|---|---|---|
| 5,954,475 A * | 9/1999 | Matsuura et al. | ............ | 415/115 |
| 6,132,173 A * | 10/2000 | Tomita et al. | ............... | 416/96 R |
| 6,190,130 B1 * | 2/2001 | Fukue et al. | ................ | 416/97 R |
| 7,147,439 B2 * | 12/2006 | Jacala et al. | ................ | 416/97 R |
| 7,371,049 B2 * | 5/2008 | Cunha et al. | ................ | 416/97 A |
| 8,011,881 B1 * | 9/2011 | Liang | ............................ | 415/115 |
| 2007/0201979 A1 * | 8/2007 | Veltre et al. | ................. | 416/97 R |
| 2010/0239432 A1 * | 9/2010 | Liang | .......................... | 416/97 R |
| 2011/0223004 A1 * | 9/2011 | Lacy et al. | .................... | 415/115 |
| 2012/0082566 A1 * | 4/2012 | Ellis et al. | .................... | 416/97 R |
| 2012/0163975 A1 * | 6/2012 | Propheter-Hinckley | ........ | 416/95 |

* cited by examiner

*Primary Examiner* — Edward Look
*Assistant Examiner* — William Grigos
(74) *Attorney, Agent, or Firm* — Mark E. Henderson; Ernest G. Cusick; Frank A. Landgraff

(57) ABSTRACT

A platform cooling arrangement in a turbine rotor blade having a platform at an interface between an airfoil and a root, wherein the rotor blade includes an interior cooling passage formed therein, wherein, in operation, the interior cooling passage comprises a high-pressure coolant region and a low-pressure coolant region, and wherein a suction side of the platform comprises a topside extending circumferentially from the airfoil to a suction side slashface, and wherein the suction side of the platform comprises an aft edge. The platform cooling arrangement may include: a manifold positioned within an aft side of the suction side of the platform; a high-pressure connector that connects the manifold to the high-pressure coolant region of the interior cooling passage; a low-pressure connector that connects the manifold to the low-pressure coolant region of the interior cooling passage; and heat transfer structure positioned within the manifold.

14 Claims, 8 Drawing Sheets

TURBINE ROTOR BLADE PLATFORM COOLING

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

As illustrated, the platform 110 may be substantially planar. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) More specifically, the platform 110 may have a planar topside 113, which, as shown in FIG. 1, may include an axially and circumferentially extending flat surface. As shown in FIG. 2, the platform 110 may have a planar underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 is employed on turbine rotor blades 100 to form the inner flow path boundary of the hot gas path section of the gas turbine. The platform 110 further provides structural support for the airfoil 102. In operation, the rotational velocity of the turbine induces mechanical loading that creates highly stressed regions along the platform 110 that, when coupled with high temperatures, ultimately cause the formation of operational defects, such as oxidation, creep, low-cycle fatigue cracking, and others. These defects, of course, negatively impact the useful life of the rotor blade 100. It will be appreciated that these harsh operating conditions, i.e., exposure to extreme temperatures of the hot gas path and mechanical loading associated with the rotating blades, create considerable challenges in designing durable, long-lasting rotor blade platforms 110 that both perform well and are cost-effective to manufacture.

One common solution to make the platform region 110 more durable is to cool it with a flow of compressed air or other coolant during operation, and a variety of these type of platform designs are known. However, as one of ordinary skill in the art will appreciate, the platform region 110 presents certain design challenges that make it difficult to cool in this manner. In significant part, this is due to the awkward geometry of this region, in that, as described, the platform 110 is a periphery component that resides away from the central core of the rotor blade and typically is designed to have a structurally sound, but thin radial thickness.

To circulate coolant, rotor blades 100 typically include one or more hollow cooling passages 116 (see FIGS. 3, 4 and 5) that, at minimum, extend radially through the core of the blade 100, including through the root 104 and the airfoil 102. As described in more detail below, to increase the exchange of heat, such cooling passages 116 may be formed having a serpentine path that winds through the central regions of the blade 100, though other configurations are possible. In operation, a coolant may enter the central cooling passages via one or more inlets 117 formed in the inboard portion of the root 104. The coolant may circulate through the blade 100 and exit through outlets (not shown) formed on the airfoil and/or via one or more outlets (not shown) formed in the root 104. The coolant may be pressurized, and, for example, may include pressurized air, pressurized air mixed with water, steam, and the like. In many cases, the coolant is compressed air that is diverted from the compressor of the engine, though other sources are possible. As discussed in more detail below, these cooling passages typically include a high-pressure coolant region and a low-pressure coolant region. The high-pressure coolant region typically corresponds to an upstream portion of the cooling passage that has a higher coolant pressure, whereas the low-pressure coolant region corresponds to a downstream portion having a relatively lower coolant pressure.

In some cases, the coolant may be directed from the cooling passages 116 into a cavity 119 formed between the shanks 112 and platforms 110 of adjacent rotor blades 100. From there, the coolant may be used to cool the platform region 110 of the blade, a conventional design of which is presented in FIG. 3. This type of design typically extracts air from one of the cooling passages 116 and uses the air to pressurize the cavity 119 formed between the shanks 112/platforms 110. Once pressurized, this cavity 119 then supplies coolant to cooling channels that extend through the platforms 110. After traversing the platform 110, the cooling air may exit the cavity through film cooling holes formed in the topside 113 of the platform 110.

It will be appreciated, however, that this type of conventional design has several disadvantages. First, the cooling circuit is not self-contained in one part, as the cooling circuit is only formed after two neighboring rotor blades 100 are assembled. This adds a great degree of difficulty and complexity to installation and pre-installation flow testing. A second disadvantage is that the integrity of the cavity 119 formed between adjacent rotor blades 100 is dependent on how well the perimeter of the cavity 119 is sealed. Inadequate sealing may result in inadequate platform cooling and/or wasted cooling air. A third disadvantage is the inherent risk that hot gas path gases may be ingested into the cavity 119 or the platform itself 110. This may occur if the cavity 119 is not maintained at a sufficiently high pressure during operation. If the pressure of the cavity 119 falls below the pressure within the hot gas path, hot gases will be ingested into the shank cavity 119 or the platform 110 itself, which typically damages these components as they were not designed to endure exposure to the hot gas-path conditions.

FIGS. 4 and 5 illustrate another type of conventional design for platform cooling. In this case, the cooling circuit is contained within the rotor blade 100 and does not involve the shank cavity 119, as depicted. Cooling air is extracted from one of the cooling passages 116 that extend through the core of the blade 110 and directed aft through cooling channels 120 formed within the platform 110 (i.e., "platform cooling channels 120"). As shown by the several arrows, the cooling air flows through the platform cooling channels 120 and exits through outlets in the aft edge 121 of the platform 110 or from outlets disposed along the suction side edge 122. (Note that in describing or referring to the edges or faces of the rectangular platform 110, each may be delineated based upon its location in relation to the suction face 105 and pressure face 106 of the airfoil 102 and/or the forward and aft directions of the engine once the blade 100 is installed. As such, as one of ordinary skill in the art will appreciate, the platform may include an aft edge 121, a suction side edge 122, a forward edge 124, and a pressure side edge 126, as indicated in FIGS. 3 and 4. In addition, the suction side edge 122 and the pressure side edge 126 also are commonly referred to as "slashfaces" and the narrow cavity formed therebetween once neighboring rotor blades 100 are installed may be referred to as a "slashface cavity".)

It will be appreciated that the conventional designs of FIGS. 4 and 5 have an advantage over the design of FIG. 3 in that they are not affected by variations in assembly or installation conditions. However, conventional designs of this nature have several limitations or drawbacks. First, as illustrated, only a single circuit is provided on each side of the airfoil 102 and, thus, there is the disadvantage of having limited control of the amount of cooling air used at different locations in the platform 110. Second, conventional designs of this type have a coverage area that is generally limited. While the serpentine path of FIG. 5 is an improvement in terms of coverage over FIG. 4, there are still dead areas within the platform 110 that remain uncooled. Third, to obtain better coverage with intricately formed platform cooling channels 120, manufacturing costs increase dramatically, particularly if the cooling channels having shapes that require a casting process to form. Fourth, these conventional designs typically dump coolant into the hot gas path after usage and before the coolant is completely exhausted, which negatively affects the efficiency of the engine. Fifth, conventional designs of this nature generally have little flexibility. That is, the channels 120 are formed as an integral part of the platform 110 and provide little or no opportunity to change their function or configuration as operating conditions vary. In addition, these types of conventional designs are difficult to repair or refurbish.

As a result, conventional platform cooling designs are lacking in one or more important areas. There remains a need for improved apparatus, systems, and methods that effectively and efficiently cool the platform region of turbine rotor blades, while also being cost-effective to construct, flexible in application, and durable.

BRIEF DESCRIPTION OF THE INVENTION

The present application thus describes a platform cooling arrangement in a turbine rotor blade having a platform at an interface between an airfoil and a root, wherein the rotor blade includes an interior cooling passage formed therein that extends from a connection with a coolant source at the root to the approximate radial height of the platform, wherein, in operation, the interior cooling passage comprises a high-pressure coolant region and a low-pressure coolant region, and wherein along a side that coincides with a suction side of the airfoil, a suction side of the platform comprises a topside extending circumferentially from the airfoil to a suction side slashface, and wherein the suction side of the platform comprises an aft edge that coincides with a trailing edge of the airfoil and a forward edge that coincides with the leading edge of the airfoil. The platform cooling arrangement may include: a manifold positioned within at least one of the forward side and the aft side of the suction side of the platform; a high-pressure connector that connects the manifold to the high-pressure coolant region of the interior cooling passage; a low-pressure connector that connects the manifold to the low-pressure coolant region of the interior cooling passage; and heat transfer structure positioned within the manifold to interact with a coolant flowing from the high-pressure connector to the low-pressure connector during operation.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
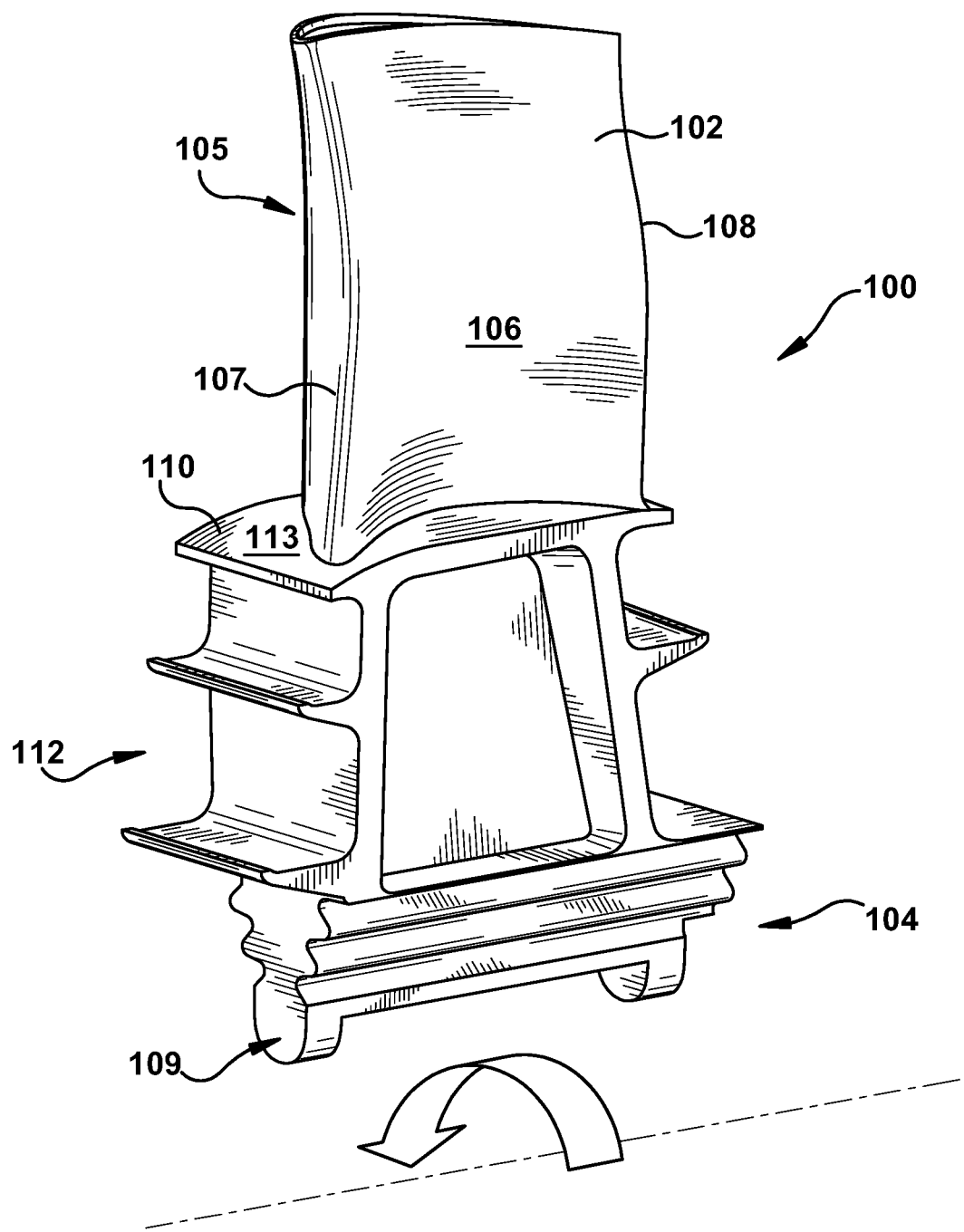
FIG. 1 illustrates a perspective view of an exemplary turbine rotor blade in which embodiments of the present invention may be employed.
Figure 2:
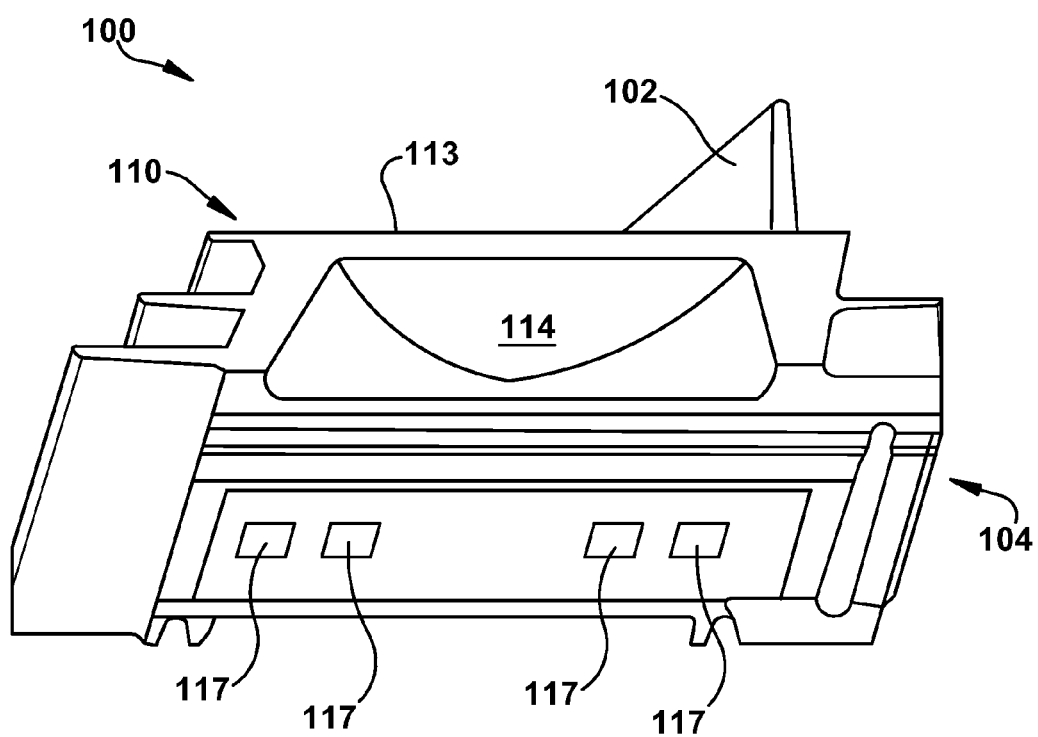
FIG. 2 illustrates an underside view of a turbine rotor blade in which embodiments of the present invention may be used.
Figure 3:
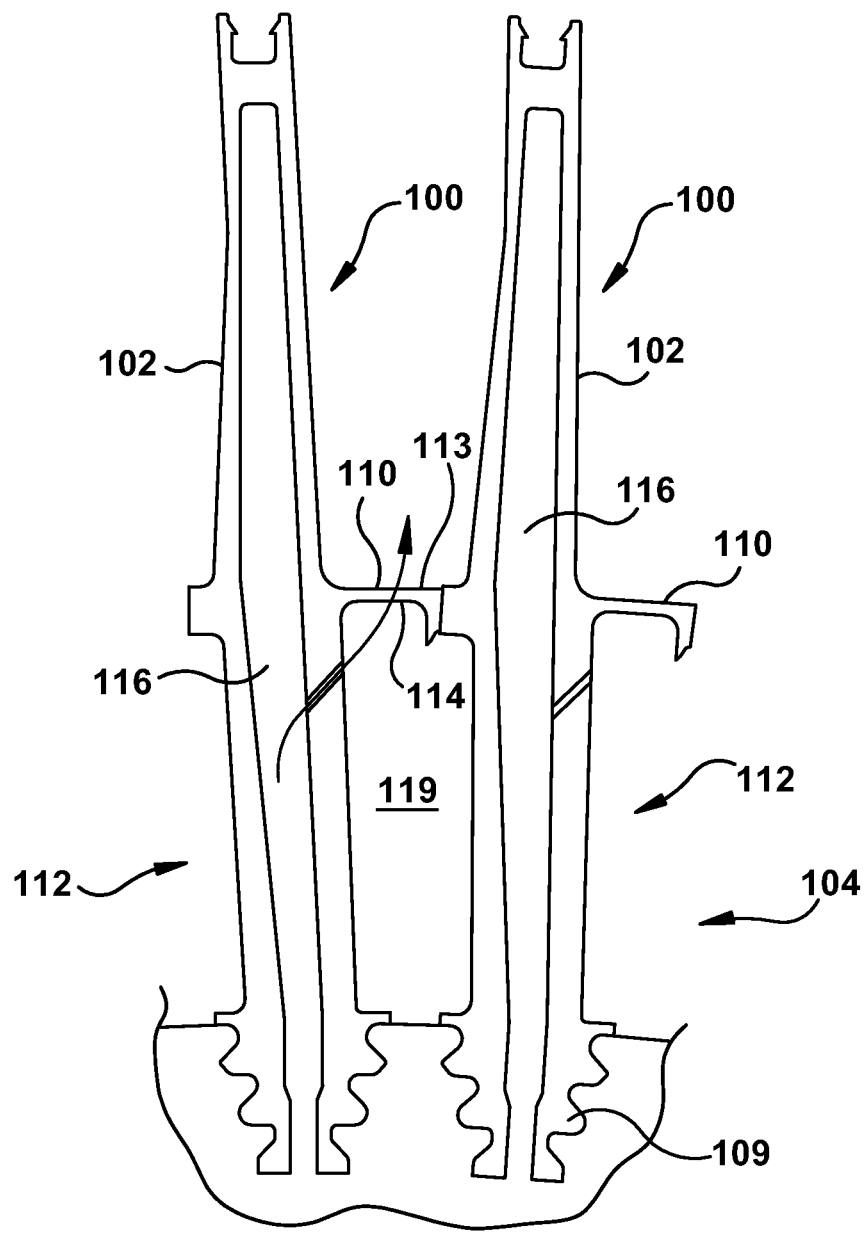
FIG. 3 illustrates a sectional view of neighboring turbine rotor blades having a cooling system according to conventional design.
Figure 4:
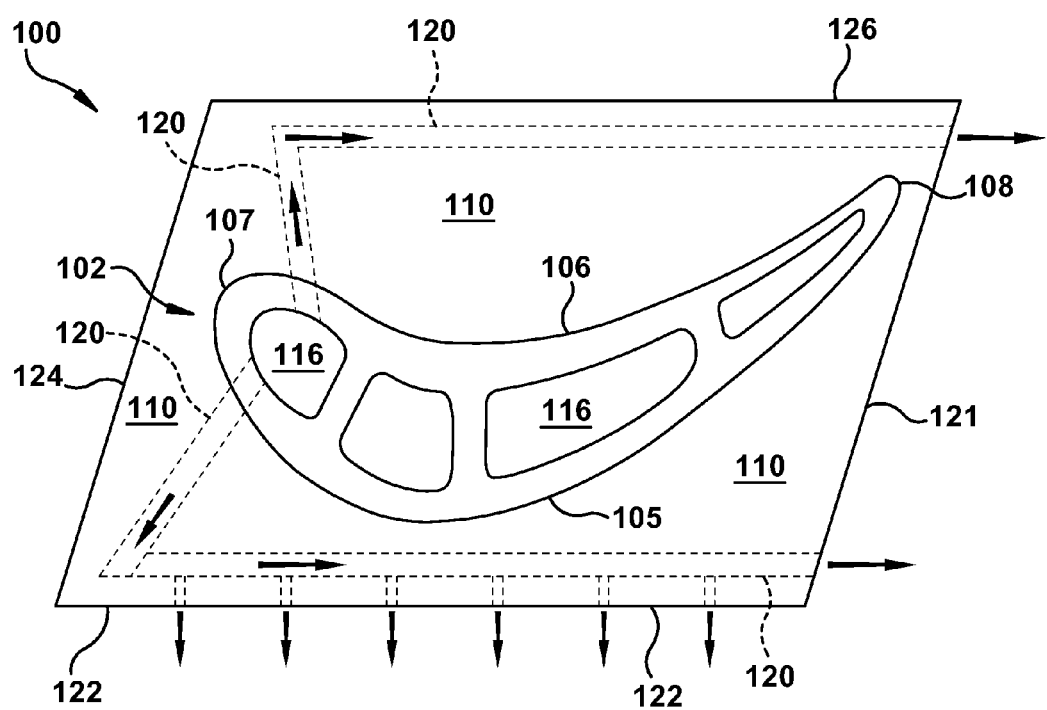
FIG. 4 illustrates a top view of a turbine rotor blade having a platform with interior cooling channels according to conventional design.
Figure 5:
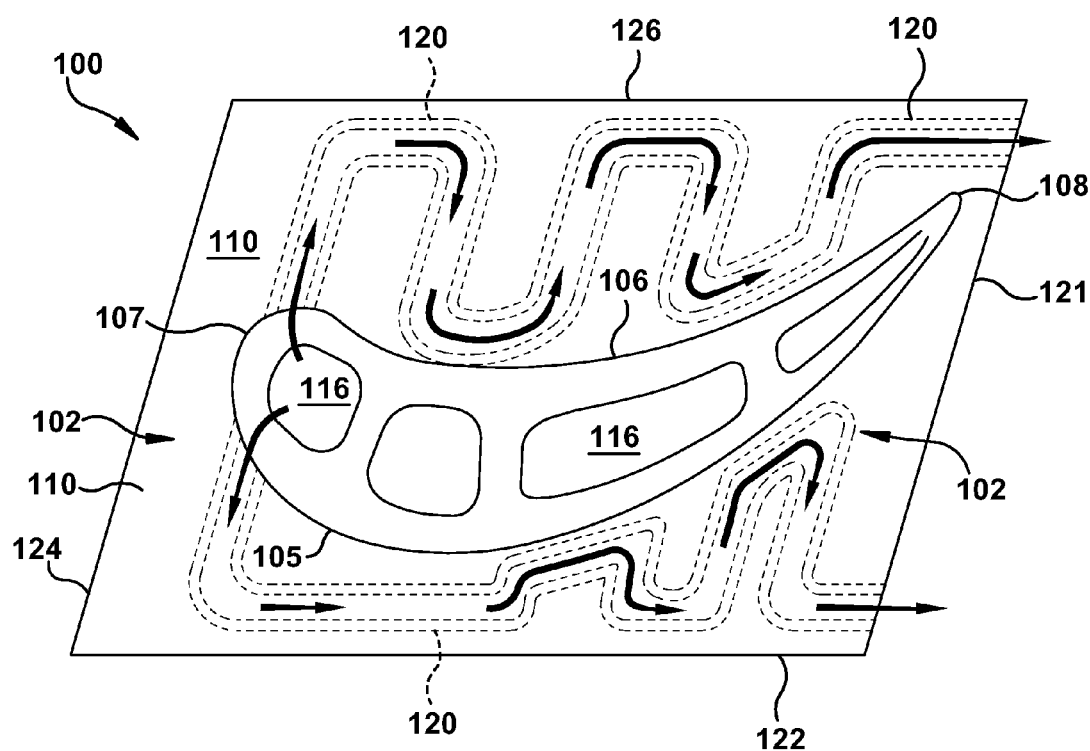
FIG. 5 illustrates a top view of a turbine rotor blade having a platform with interior cooling channels according to an alternative conventional design.

It will be appreciated that turbine blades that are cooled via the internal circulation of a coolant typically include an interior cooling passage 116 that extends radially outward from the root, through the platform region, and into the airfoil, as described above in relation to several conventional cooling designs. It will be appreciated that certain embodiments of the present invention may be used in conjunction with conventional coolant passages to enhance or enable efficient active platform cooling, and the present invention is discussed in connection with a common design: an interior cooling passage 116 having a winding or serpentine configuration. As depicted in the figures, the serpentine path is typically configured to allow a one-way flow of coolant and includes features that promote the exchange of heat between the coolant and the surrounding rotor blade 100. In operation, a pressurized coolant, which typically is compressed air bled from the compressor (though other types of coolant, such as steam, also may be used with embodiments of the present invention), is supplied to the interior cooling passage 116 through a connection formed through the root 104. The pressure drives the coolant through the interior cooling passage 116, and the coolant convects heat from the surrounding walls.

As the coolant moves through the cooling passage 116, it will be appreciated that it loses pressure, with the coolant in the upstream portions of the interior cooling passage 116 having a higher pressure than coolant in downstream portions. As discussed in more detail below, this pressure differential may be used to drive coolant across or through cooling passages formed in the platform. It will be appreciated that the present invention may be used in rotor blades 100 having internal cooling passages of different configurations and is not limited to interior cooling passages having a serpentine form. Accordingly, as used herein, the term "interior cooling passage" or "cooling passage" is meant to include any passage or hollow channel through which coolant may be circulated in the rotor blade. As provided herein, the interior cooling passage 116 of the present invention extends to at least to the approximate radial height of the platform 116, and may include at least one region of relatively higher coolant pressure (which, hereinafter, is referred to as a "region of high pressure" and, in some cases, may be an upstream section within a serpentine passage) and at least one region of relatively lower coolant pressure (which, hereinafter, is referred to as a "region of low pressure" and, relative to the region of high pressure, may be a downstream section within a serpentine passage).

In general, the various designs of conventional internal cooling passages 116 are effective at providing active cooling to certain regions within the rotor blade 100. However, as one of ordinary skill in the art will appreciate, the platform region proves more challenging. This is due, at least in part, to the platform's awkward geometry—i.e., its narrow radial height and the manner in which it juts away from the core or main body of the rotor blade 100. However, given its exposures to the extreme temperatures of hot gas path and high mechanical loading, the cooling requirements of the platform are considerable. As described above, conventional platform cooling designs are ineffective because they fail to address the particular challenges of the region, are inefficient with their usage of coolant, and/or are costly to fabricate.

Figure 6:
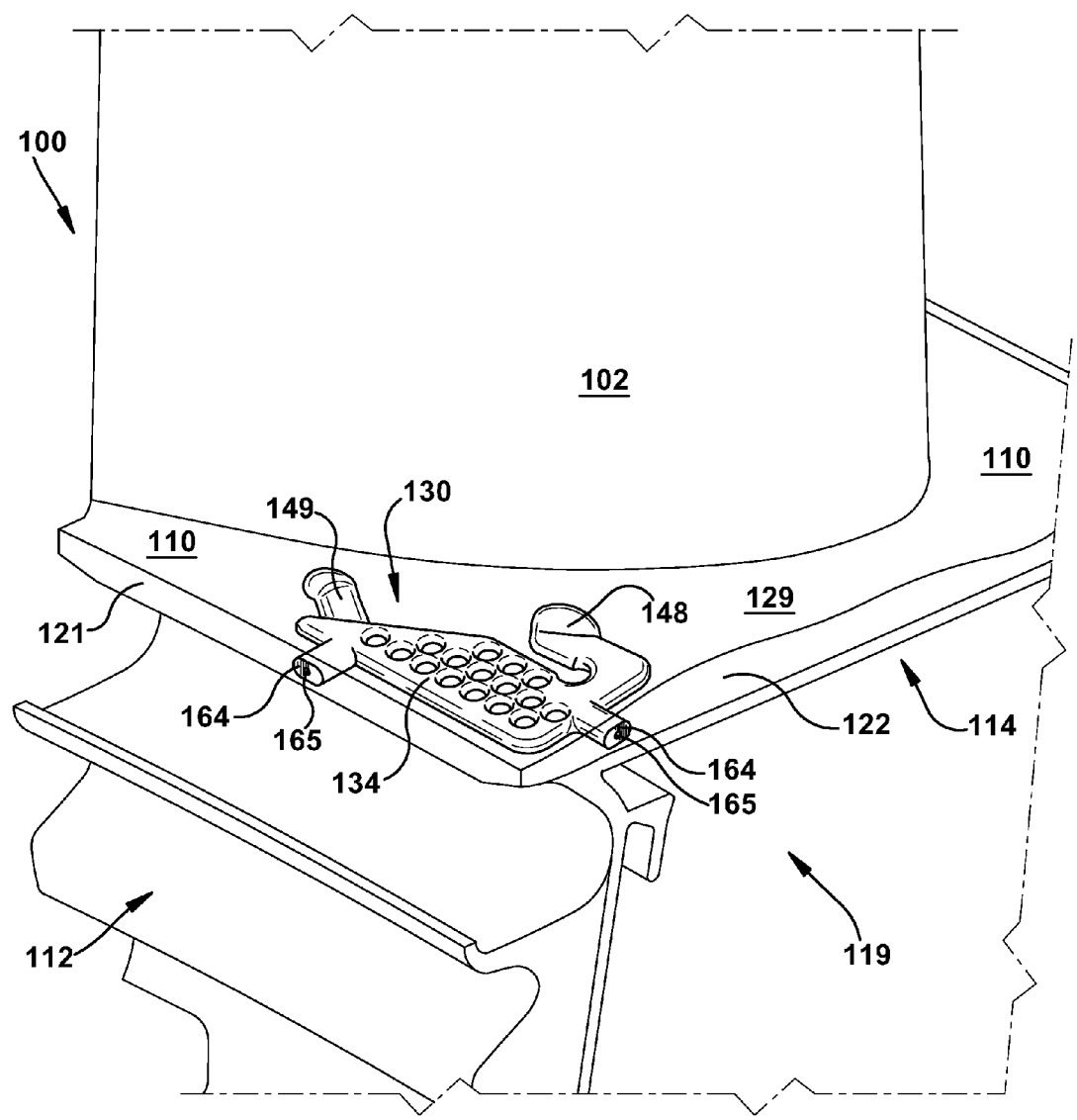
FIG. 6 illustrates a perspective view of a turbine rotor blade and platform cooling arrangement according to an exemplary embodiment of the present invention.
Figure 7:
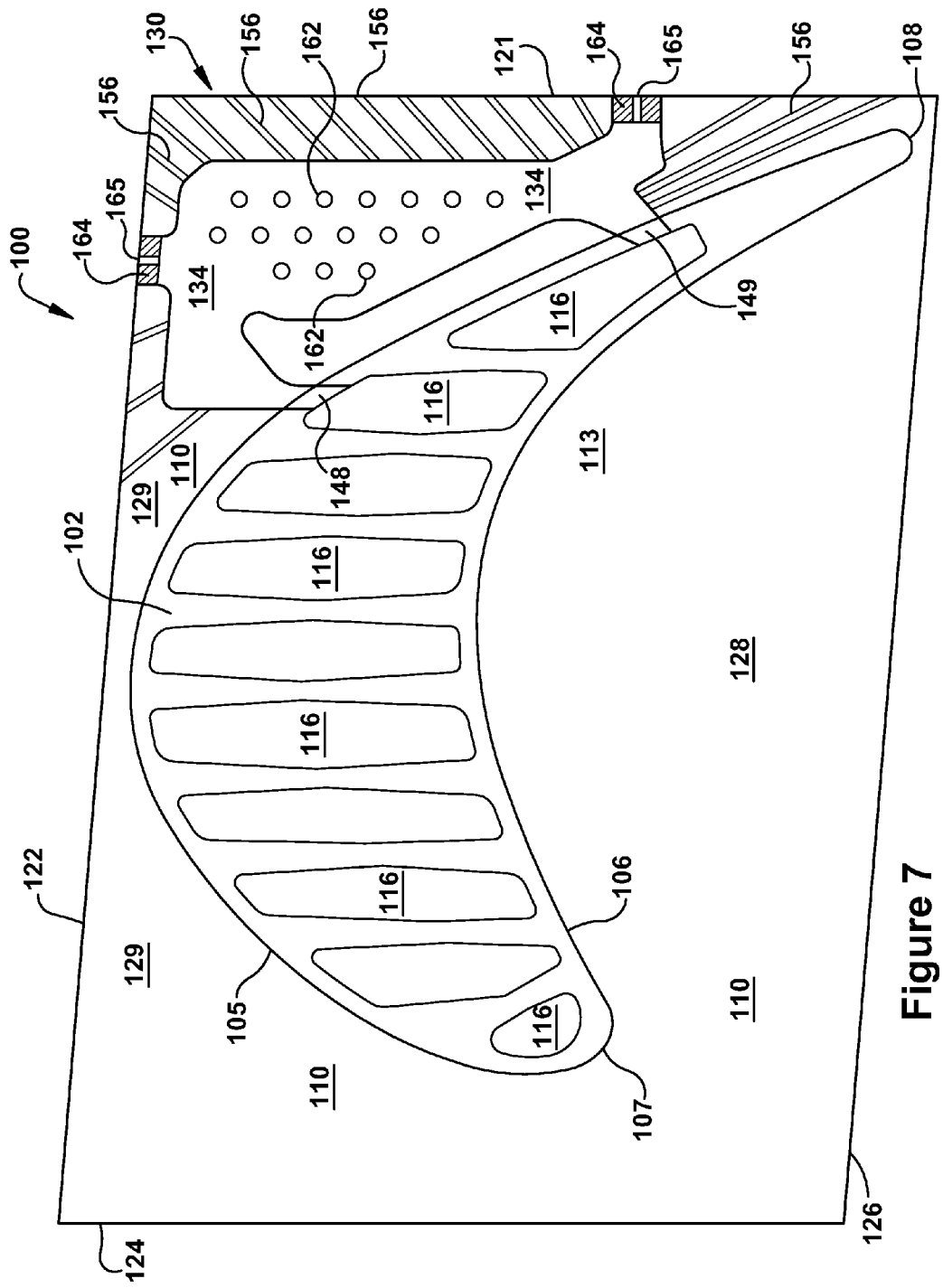
FIG. 7 illustrates a top with partial cross-sectional view of the turbine rotor blade and platform cooling arrangement according to an exemplary embodiment of the present invention.
Figure 8:
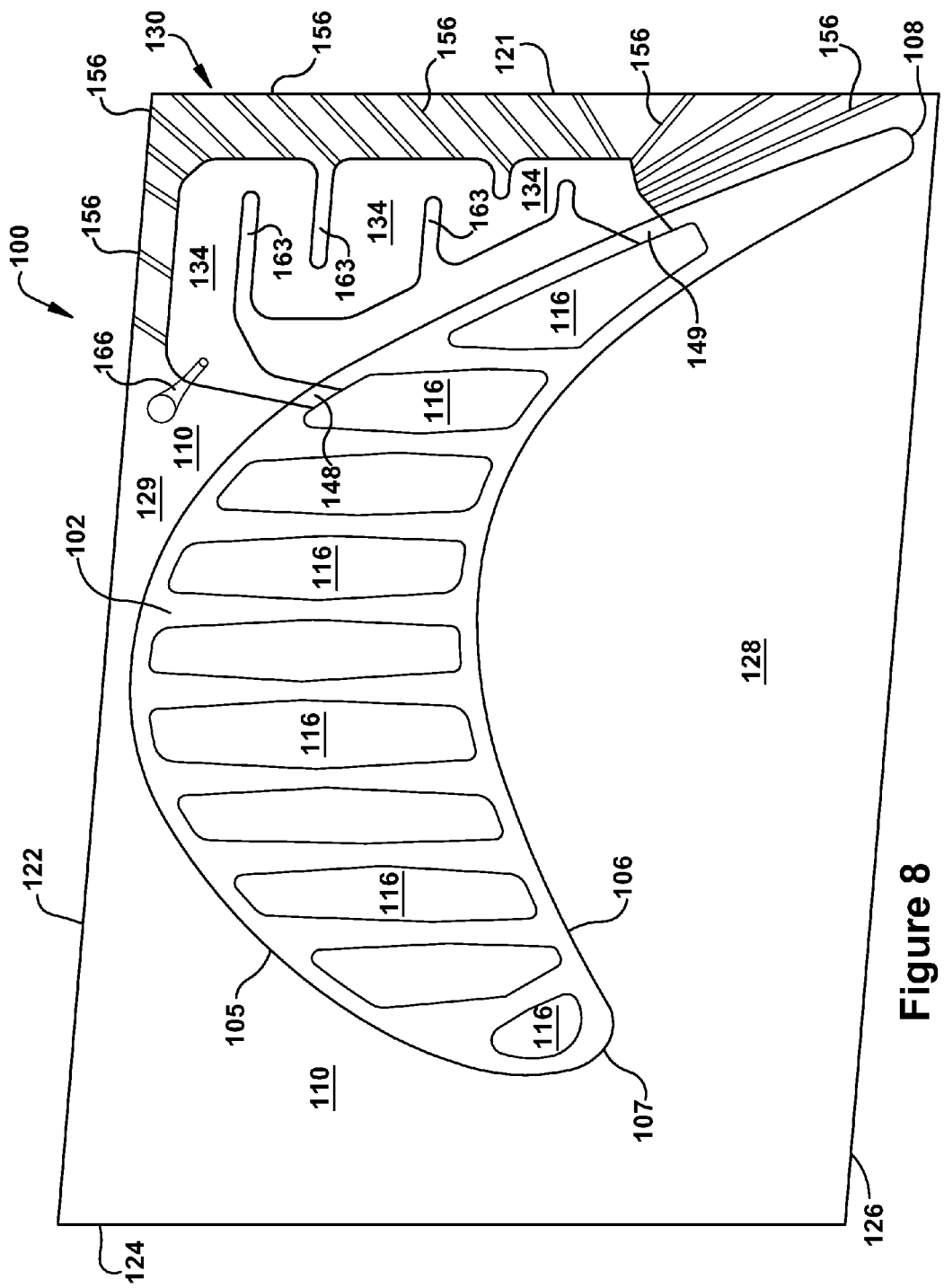
FIG. 8 illustrates a top with partial cross-sectional view of the turbine rotor blade and platform cooling arrangement according to an alternative embodiment of the present invention.

Referring again to the figures, FIGS. 6 through 8 provide several views of exemplary embodiments of the present invention, i.e., platform cooling configurations 130. As shown, in certain embodiments, a manifold 134 is positioned within an aft side of the suction side 129 of a platform 110. A high-pressure connector 148 may be configured to connect the manifold 134 to a high-pressure coolant region of the interior cooling passage 116, and a low-pressure connector 149 may be configured to connect the manifold 134 to a low-pressure coolant region of the interior cooling passage 116.

Heat transfer structure may be positioned within the manifold 134 to interact with a coolant flowing from the high-pressure connector 148 to the low-pressure connector 149 during operation. In certain embodiments, as shown in FIGS. 6 and 7, the heat transfer structure may include a plurality of pedestals 162. In other embodiments, the heat transfer structure may include a winding path, as shown in FIG. 8. The winding path through the manifold 134 may be formed via alternating manifold partitions 163. The manifold 134 may include a planar ceiling and a planar floor that resides a substantially constant radial height from each another and may be oriented such that each may be substantially parallel to the platform 110. The pedestals 162 may include cylindrical structures stretching between the ceiling and floor of the manifold 134. The plurality of pedestals 162 may include at least five pedestals 162 spaced through the manifold 134. In other embodiments, the plurality of pedestals 162 may include at least ten pedestals 162 spaced through the manifold 134. In other instances, the heat transfer structure may include a plurality of parallel cooling passages arranged to traverse the manifold 134 from the high-pressure connector 148 to the low-pressure connector 149. The parallel cooling passages may be configured with walls that stretch between the ceiling and the floor of the manifold 134, similar to the way the partitions 163 are formed to direct the coolant through a winding path.

The platform may include a planar topside 113 that is approximately parallel to a planar underside 114. The manifold 134 may be disposed between the planar topside 113 and the planar underside 114 and be approximately parallel thereto. The heat transfer structure and manifold 134 may be configured to channel coolant across the manifold 134 from the high-pressure connector 148 to the low-pressure connector 149 during operation. The location at which the high-pressure connector 148 connects to the manifold 134 may oppose the location at which the low-pressure connector 149 connects to the manifold 134 across at least a significant portion of the manifold 134. In this manner, the coolant flowing from the high-pressure connector 148 to the low-pressure connector 149 may cross through a significant portion of the manifold 134.

The manifold 134 may include a position within the aft side of the suction side 129 of the platform 110 (the suction side 128 being on the opposite side of the airfoil 102 than the pressure side 128 of the platform 110) and a shape that approximately corresponds to the shape of the aft side of the suction side 129 of the platform 110. Accordingly, the first interior wall of the manifold 134 extends in spaced relation to a profile of the suction side 105 of a base of the airfoil 110, a second interior wall extends in approximately spaced relation to the aft edge 121 of the platform 110, and a third interior wall extends in approximately spaced relation to the suction side slashface 122 of the platform 110. As illustrated, the manifold 134 may narrow axially as the manifold 134 extends from a first position near the suction side slashface 122 to a second position near the pressure side slashface 126. In some embodiments, the manifold 134 may include an approximately constant radial height throughout. In certain embodiments, the manifold 134 may be configured such that, in use, substantially all of the coolant flowing through the manifold 134 may be returned to the interior cooling passage via the low-pressure connector 149. In this case, the cooling apertures 156 may not be formed, as shown in FIG. 6 and an print outlets 165 formed via a casting process may be completely plugged with plugs 164.

In other embodiments, a plurality of cooling apertures 156 may extend between the manifold 134 and the suction side slashface 122 and the aft edge 121 of the platform 110. The cooling apertures 156 may be configured to provide an outlet for a portion of the coolant flowing through the manifold 134. The cooling apertures 156 may be configured to have a predetermined flow area, the predetermined flow area corresponding to a desired coolant impingement characteristic. That is, the cooling apertures 156 may be narrowly formed so that the released coolant is impinged and directed with velocity against the slashface of the adjacent turbine blade 100, which generally increases cooling effectiveness of the coolant. It will be appreciated that the slashface cavity and the slashfaces that define them are difficult regions of the platform 110 to cool, and that slashface cooling apertures 156 may be an effective way to do this. Cooling apertures 156 formed along the aft edge 121 of the platform 110 may similarly cool this region. In certain embodiments, film cooling apertures 166, as shown in FIG. 8, may be formed that connect the manifold 134 to ports formed through the topside 113 of the platform 110. Coolant flowing through these apertures may provide film cooling to the topside of the platform 110. The manifold 134 cooling apertures 156 and the film cooling apertures 166 may be formed or metered such that at least 50% of the coolant flowing through the manifold 134 may be returned to the interior cooling passage via the low-pressure connector 149.

The low-pressure connector 149 may include a location near the trailing edge 108 of the airfoil 102, as illustrated. The high-pressure connector 148 may include a location near the mid-region of the airfoil 102. More specifically, the high-pressure connector 148 may be configured to extend from a position within the platform 110 that, in profile, aligns with a middle portion of the airfoil to a position in the platform 110 near the suction side slashface 122 of the platform 110. The low-pressure connector 149 may be configured to extend from a position within the platform 110 that, in profile, aligns with an aft portion of the airfoil 102 to a position in the platform 110 near the aft edge 121 of the platform 110.

In operation, the cooling apparatus of the present invention may function as follows. A portion of the coolant supply flowing through the interior cooling passage 116 enters the high-pressure connector 148. The coolant then passes through the manifold 134 and, as it passes therethrough, the coolant convects heat from surrounding platform 110, thereby cooling it. In this manner, the platform cooling arrangement 130 of the present invention extracts a portion of the coolant from the interior cooling passage 116, uses the coolant to remove heat from the platform 110, and then returns the coolant, or at least a portion of the coolant, to the interior cooling passage 116, where the coolant may be used to further.

The present invention provides a mechanism to actively cool the platform region of a combustion turbine rotor blade. As stated, this region is typically difficult to cool and, given the mechanical loads of the area, is a location that receives high distress as firing temperatures are increased. Accordingly, this type of active platform cooling is a significant enabling technology as higher firing temperatures, increased output, and greater efficiency are sought.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A platform cooling arrangement in a turbine rotor blade having a platform at an interface between an airfoil and a root, wherein the rotor blade includes an interior cooling passage formed therein that extends from a connection with a coolant source at the root to the approximate radial height of the platform, wherein, in operation, the interior cooling passage comprises a high-pressure coolant region and a low-pressure coolant region, and wherein along a side that coincides with a suction side of the airfoil, a suction side of the platform comprises a topside extending circumferentially from the airfoil to a suction side slashface, and wherein the suction side of the platform comprises an aft edge that coincides with a trailing edge of the airfoil, the platform cooling arrangement comprising:

a manifold positioned within at least one of a forward side and an aft side of the suction side of the platform;

a high-pressure connector that connects the manifold to the high-pressure coolant region of the interior cooling passage;

a low-pressure connector that connects the manifold to the low-pressure coolant region of the interior cooling passage; and heat transfer structure positioned within the manifold to interact with a coolant flowing from the high-pressure connector to the low-pressure connector during operation;

wherein the location at which the high-pressure connector connects to the manifold opposes the location at which the low-pressure connector connects to the manifold across at least a significant portion of the manifold;

wherein the manifold comprises a position within the aft side of the suction side of the platform and a shape that approximately corresponds to the shape of the aft side of the suction side of the platform;

wherein a first interior wall of the manifold extends in spaced relation to a profile of the suction side of a base of the airfoil, a second interior wall extends in approximately spaced relation to the aft edge of the platform, and a third interior wall extends in approximately spaced relation to the suction side slashface of the platform;

wherein the manifold narrows axially as the manifold extends from a first position near the suction side slashface to a second position near the pressure side slashface; and wherein the manifold comprises an approximately constant radial height;

wherein a plurality of cooling apertures extend between the manifold and the suction side slashface and the manifold and the aft edge of the platform, the cooling apertures being configured to provide an outlet for a portion of the coolant flowing through the manifold; and wherein the cooling apertures are configured to have a predetermined flow area, the predetermined flow area corresponding to a desired coolant impingement characteristic.

2. The platform cooling arrangement according to claim 1, wherein the heat transfer structure comprises a plurality of pedestals.

3. The platform cooling arrangement according to claim 1, wherein the heat transfer structure comprises a winding path.

4. The platform cooling arrangement according to claim 1, wherein:

the platform comprises a planar topside that is approximately parallel to a planar underside;

the manifold is disposed between the planar topside and the planar topside and approximately parallel thereto; and the heat transfer structure and manifold are configured to channel coolant across the manifold from the high-pressure connector to the low-pressure connector during operation.

5. The platform cooling arrangement according to claim 1, wherein the manifold is configured such that, in use, at least 50% of the coolant flowing through the manifold is returned to the interior cooling passage via the low-pressure connector.

6. The platform cooling arrangement according to claim 5, further comprising film cooling apertures that connect the manifold to ports formed through the topside of the platform.

7. The platform cooling arrangement according to claim 1, wherein the manifold comprises a planar ceiling and a planar floor that resides a substantially constant radial height from each another and are oriented such that each is substantially parallel to the platform.

8. The platform cooling arrangement according to claim 7, wherein the heat transfer structure comprises a plurality of pedestals, the pedestals comprising cylindrical structures stretching between the ceiling and floor of the manifold.

9. The platform cooling arrangement according to claim 8, wherein the plurality of pedestals includes at least 5 pedestals spaced through the manifold.

10. The platform cooling arrangement according to claim 8, wherein the plurality of pedestals includes at least 10 pedestals spaced through the manifold.

11. The platform cooling arrangement according to claim 7, wherein the heat transfer structure comprises a plurality of parallel cooling passages arranged to traverse the manifold from the high-pressure plenum to the low-pressure plenum, the parallel cooling passages including walls that stretch between the ceiling and the floor of the manifold.

12. The platform cooling arrangement according to claim 1, wherein the high-pressure connector comprises a location near the first position.

13. The platform cooling arrangement according to claim 1, wherein the low-pressure connector comprises a position near the second position.

14. The platform cooling arrangement according to claim 13, wherein the high-pressure connector extends from a position within the platform that, in profile, aligns with a middle portion of the airfoil to a position in the platform near the suction side slashface of the platform; and wherein the low-pressure connector extends from a position within the platform that, in profile, aligns with an aft portion of the airfoil to a position in the platform near the aft edge of the platform.

\* \* \* \* \*

UNITED STATES PATENT AND TRADEMARK OFFICE
CERTIFICATE OF CORRECTION

PATENT NO. : 8,905,714 B2  
APPLICATION NO. : 13/341027  
DATED : December 9, 2014  
INVENTOR(S) : Ellis et al.

Page 1 of 1

It is certified that error appears in the above-identified patent and that said Letters Patent is hereby corrected as shown below:

In the Specification

In Column 3, Line 5, delete "platform itself 110." and insert -- platform 110 itself. --, therefor.

In Column 3, Line 17, delete "blade 110" and insert -- blade 100 --, therefor.

In Column 5, Line 37, delete "platform 116," and insert -- platform 110, --, therefor.

Signed and Sealed this  
Nineteenth Day of May, 2015

Michelle K. Lee  
*Director of the United States Patent and Trademark Office*